United States Patent [19]

Rasmusson et al.

[11] Patent Number: 5,835,851

[45] Date of Patent: Nov. 10, 1998

[54] METHOD AND APPARATUS FOR ECHO REDUCTION IN A HANDS-FREE CELLULAR RADIO USING ADDED NOISE FRAMES

[75] Inventors: Jim A. J. Rasmusson, Raleigh; Torbjörn Wilson Sölve, Cary; Robert Allen Zak, Raleigh, all of N.C.

[73] Assignee: Ericsson Inc., Research Triangle Park, N.C.

[21] Appl. No.: 375,144

[22] Filed: Jan. 19, 1995

[51] Int. Cl.$^6$ .................................................. H04B 1/46

[52] U.S. Cl. ........................ 455/79; 455/33.1; 379/59; 379/390

[58] Field of Search ...................... 455/54.1, 50.1, 455/67.3, 296, 89, 33.1, 79, 78; 379/392, 410, 411, 390, 388, 389, 391, 406, 408, 421, 420, 58, 59

[56] References Cited

U.S. PATENT DOCUMENTS 4,965,822  10/1990  Williams ........................ 379/411 X
5,222,251  6/1993  Roney, IV et al. ............... 379/410 X

*Primary Examiner*—Reinhard J. Eisenzopf
*Assistant Examiner*—Philip J. Sobutka
*Attorney, Agent, or Firm*—Nixon & Vanderhye P.C.

[57] ABSTRACT

A method and apparatus for reducing the echo in a hands-free digital cellular communications system is presented. Acting upon speech signals being present in the downlink, uplink speech frames generated by the hands-free communication device are attenuated to prevent the downlink speech signals from being transmitted at full volume back on the uplink as an echo. Added to the attenutated uplink speech frame is a noise frame generated by the hands-free communication device, which provides a consistent level of background noise to the person at the other end of the call. The noise codeword is further randomly ordered to prevent any modulative effects from the process.

9 Claims, 6 Drawing Sheets

METHOD AND APPARATUS FOR ECHO REDUCTION IN A HANDS-FREE CELLULAR RADIO USING ADDED NOISE FRAMES

FIELD OF THE INVENTION

The present invention relates to cellular telephone systems and more specifically to a method of and apparatus for reducing the echo and providing comfort noise in a voice switched hands-free system for a cellular radiotelephone.

BACKGROUND OF THE INVENTION

Cellular radiotelephones have become ubiquitous tools for wireless voice communication. Many cellular radiotelephones can be operated using a so-called "hands-free" system which allows the user of the cellular radiotelephone to communicate over short distances without having to hold a handset. The hands-free system is intended to be used while operating an automobile or when the user's hands are otherwise preoccupied. The hands-free system allows the user of a cellular radiotelephone to engage in a conversation with another party by speaking into a microphone and listening to the other party by means of a loudspeaker. The microphone and loudspeaker are sometimes referred to as the "hands-free" loudspeaker and microphone since these are sometimes located external to the cellular radiotelephone and operate in place of the existing microphone and loudspeaker located in the handset, or in the cellular radiotelephone itself. The hands-free system processes signals produced by the microphone to generate uplink signals which are ultimately transmitted to a base station. The hands-free system also processes downlink signals received from the base station.

There are essentially two types of hands-free systems: full-duplex and half-duplex. In a full-duplex system, both the uplink and downlink may be active simultaneously. In a full-duplex hands-free system, downlink signals which ultimately emanate from the hands-free loudspeaker as acoustic sound may be picked up by the hands-free microphone. For proper full-duplex operation, the downlink signal must be removed from the hands-free microphone signal to prevent the person at the other end of the call from experiencing a pernicious acoustic echo of their own voice. Depending upon the amplitude and delay of the echo, normal conversation may be very difficult to achieve when using a full-duplex hands-free arrangement unless the downlink echo can be suppressed.

Many solutions have been proposed to eliminate, or to otherwise significantly reduce, the magnitude of the downlink echo in a full duplex system: see, for example, Park, et al., "Acoustic Echo Cancellation for Full-Duplex Voice Transmission on Fading Channels", Proceedings of the International Mobile Satellite Conference, Ottawa, Ontario, Canada, Jun. 18–20, 1990. Existing echo cancellation techniques are complicated, require a great deal of processing power, and are not generally appropriate for use in a cost-sensitive consumer product such as a cellular radiotelephone.

In a half-duplex hands-free system, only one path (uplink or downlink) is open at a time; the other is muted. Whichever path is open determines which person may speak. Although effective in preventing an echo, a half-duplex system results in stilted, unnatural conversation. To improve the performance of half-duplex hands-free systems, voice-switching may be employed. In a voice switched system, the activity of the persons speaking is used to decide which path is open. A voice activity detector determines which person is talking and mutes the signal from the other end. This prevents the talker's echo from being picked up and retransmitted to the talker. In ideal conditions, well disciplined users of a voice-switched hands-free system achieve near full-duplex performance.

One problem with a voice-switched hands-free system occurs when the hands-free system is used in a noisy environment such as in a moving automobile. When the hands-free microphone is muted, the person at the other end of the call suddenly hears silence when, previously, the background noise of the automobile was audible. The sudden loss of background noise may suggest to the person at the other end of the call that the connection has been lost. In order to overcome this, artificial background noise, called comfort noise, is provided. One example which is used in a time division multiple access (TDMA) cellular radio system is described in U.S. Pat. No. 5,222,251 where the microphone signals are replaced by codewords representing ambient noise. The codewords are produced by a speech compression algorithm known as VSELP. This technique has several disadvantages. First, since the microphone signals are replaced by codewords representing ambient noise, there can be an abrubt change between the actual ambient noise—which may be dynamic—and the artificial ambient noise. If the difference between the actual ambient noise and the artificial ambient noise represented by codewords is significant, the landline user may find the replacement noticeable. Second, since the microphone signals are wholly replaced, the user of the radiotelephone is unable to "cut-in" on the other party by raising his or her voice as can be done in a normal telephone conversation. Thirdly, in a TDMA system, successively replacing the microphone signals with the same artificial codeword may produce a modulative effect which could be distracting to the user.

SUMMARY OF THE INVENTION

The aforementioned problem of reducing the echo and providing comfort noise in a cellular radiotelephone arranged in a hands-free configuration is ameliorated in accordance with the present invention.

A method and apparatus is presented in which noise frames representing ambient noise are generated by the cellular radiotelephone and are added to attenuated uplink speech frames derived from a microphone signal. The attenuation may be gradually applied to the speech frames. A variable pointer is used to randomly order the noise frame to reduce the modulative effect.

These and other features and advantages of the present invention will be readily apparent to one of ordinary skill in the art from the following written description when read in conjunction with the drawings in which like reference numerals refer to like elements.

BRIEF DESCRIPTION OF THE DRAWINGS

An exemplifying embodiment of the invention will now be described in more detail with reference to the accompanying drawings, in which.

DESCRIPTION OF THE INVENTION

In the following description, for purposes of explanation and not limitation, specific details are set forth, such as particular circuits, circuit components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

Figure 1:
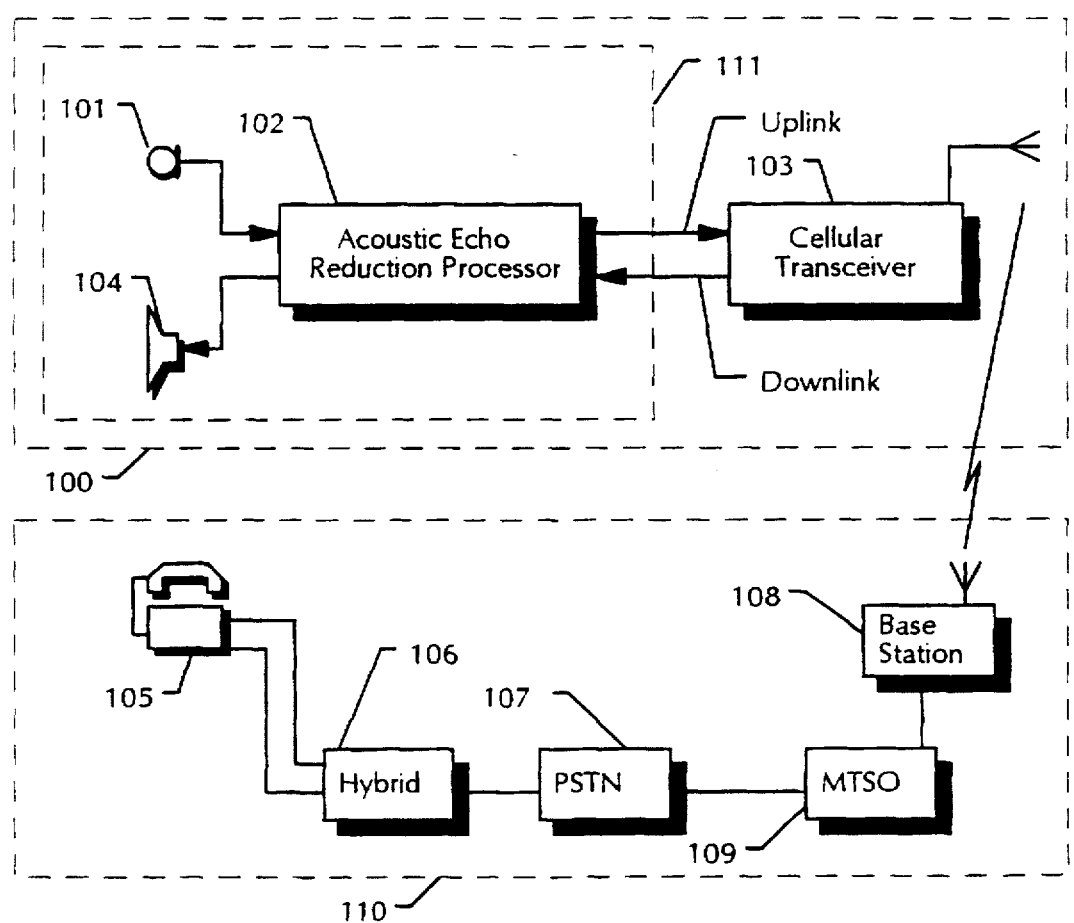
FIG. 1 is a schematic illustration of a cellular radio communication system where the cellular radiotelephone is configured in a hands-free arrangement.

In FIG. 1 is shown a cellular radio communication system in which the present invention may be advantageously employed. An example of a cellular radio communication system, known as D-AMPS, is currently in use in the United States and in several other countries. D-AMPS is described in the EIA/TIA standard entitled "Cellular System Dual-Mode Mobile Station—Base Station Compatibility Standard, IS54-B", available from the Telecommunications Industry Association, 2001 Pennsylvania Avenue, N.W., Washington, D.C. 20006. In this illustration, cellular radiotelephone 100, which is configured in a hands-free arrangement, is in radio communication with landline telephone user 110. Radio signals transmitted from cellular radiotelephone 100 (i.e., the uplink) are received by cellular base station 108 which is interfaced to public switched telephone network (PSTN) 107 via mobile telephone switching office (MTSO) 109. Conventional landline telephone 105 is coupled to PSTN 107 via hybrid circuit 106. MTSO 109 may alternatively provide a radio connection between two cellular radiotelephone as is obvious to one skilled in the art.

Cellular telephone 100 comprises cellular transceiver 103 which is coupled to hands-free system 111. Hands-free system 111 comprises acoustic echo processor 102, loudspeaker 104, and microphone 101. Cellular transceiver 103 may be found in a conventional cellular radiotelephone such as the DH 338 manufactured by the instant assignee of the present invention.

Figure 2:
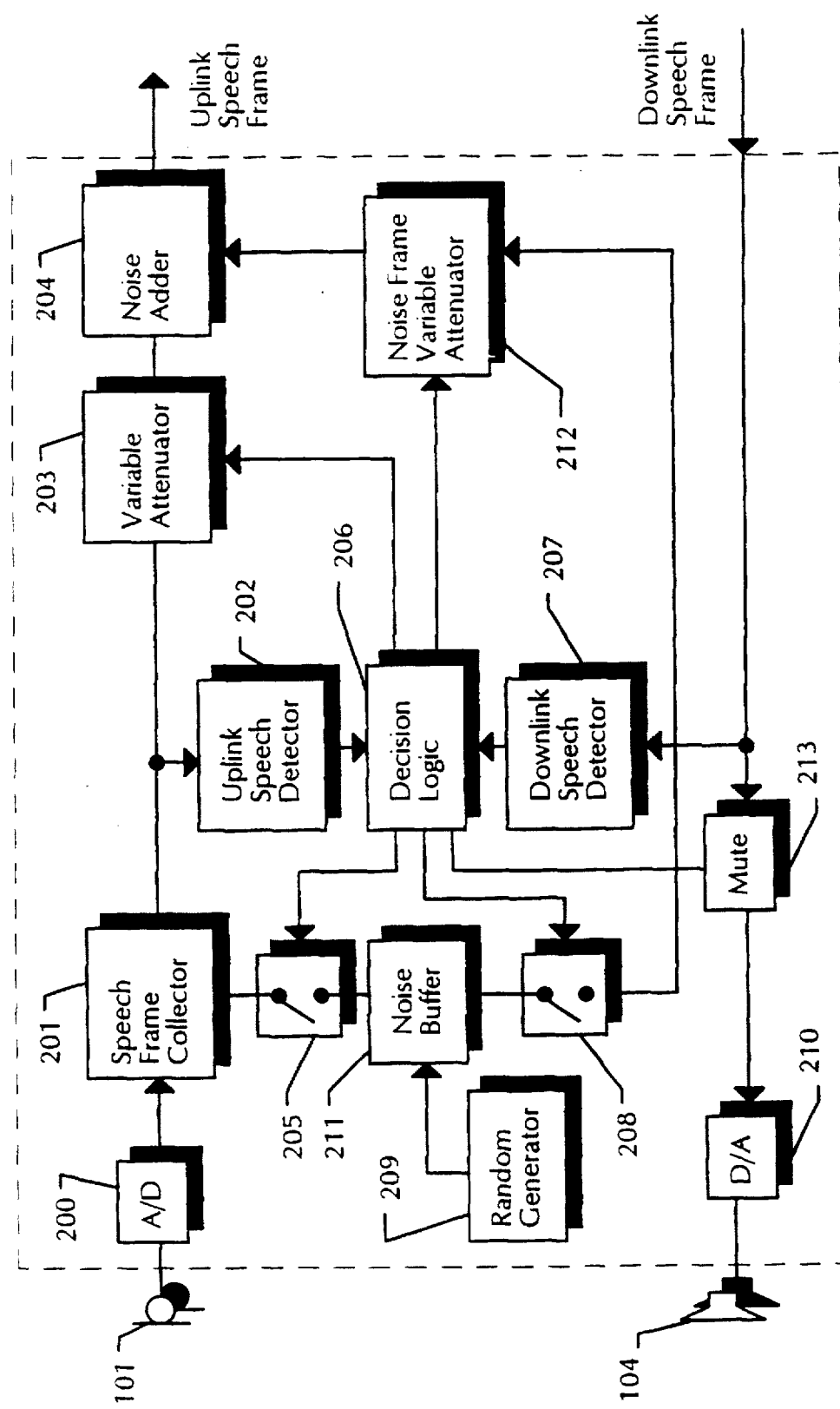
FIG. 2 is a schematic illustration of a hands-free system according to an embodiment of the present invention.

The acoustic echo reduction processor 102 generally shown in FIG. 1 is illustrated in greater detail in FIG. 2. Referring now to FIG. 2, acoustic signals, such as speech, environmental noise, and/or a combination thereof, are received by microphone 101 whose analog signals are coupled to analog to digital (A/D) converter 200. A/D converter 200 samples the analog microphone signals with, for example, 13 bit/sample resolution at 8 kilosamples/second to produce a 104 kilobit/second pulse code modulation (PCM) bitstream. The PCM bitstream is serially transmitted to speech frame collector 201 which arranges groups of samples into so-called speech frames which, in this example, are 160 samples, or 2080 bits, long. Although referred to herein as speech frames, the samples may, or may not, include actual speech. It is also not intended to limit the definition of a speech frame to a TDMA communication format. In code division multiple access, or CDMA, for example, the speech frame is not broken into discrete temporal blocks, but rather is a continuous stream of digital data whose bitrate is increased using a spreading code. Similarly in other multiple access, or non-multiple access, digital communication systems, the concept of a speech frame as a continuous bitstream equally applies as is obvious to one skilled in the art. The speech frames are coupled to the uplink speech detector 202 which analyzes each speech frame to determine if human speech is present. This determination may be accomplished by, for example, analyzing the energy content of the speech frame as described in U.S. Pat. No. 5,511,414 to Solve, et al. entitled "System for Adaptively Reducing Noise in Speech Signals" filed Sep. 29, 1993, assigned to the same assignee as the present invention and incorporated herein by reference in its entirety. An indication of the presence, or absence, of human speech in the speech frame is coupled to the decision logic block 206. The speech frames are coupled also to the uplink variable attenuator 203 and subsequently to noise adder 204. The output of noise adder 204 is referred to herein as the uplink speech frame which is coupled to radio transceiver 103.

Similarly, downlink speech frames received from radio transceiver 103 are coupled to the downlink speech detector 207 which determines the presence, or absence, of human speech in the downlink speech frame in the same manner as that described for the uplink speech detector 202. The output of the downlink speech detector is coupled also to decision logic block 206.

By means of definition, what is referred to as the uplink path begins with the hands-free microphone 101, ends with the landline telephone 105 and includes everything therebetween. Similarly, what is referred to as the downlink path begins with the landline telephone 105, ends with the hands-free loudspeaker 104 and includes everything therebetween. When the uplink path is open, the user of the cellular radiotelephone 100 may speak into microphone 101 and be heard by the other party at telephone 105. Similarly, when the downlink path is open, the landline user may speak into landline telephone 105 and be heard by the cellular user at speaker 104.

Figure 3:
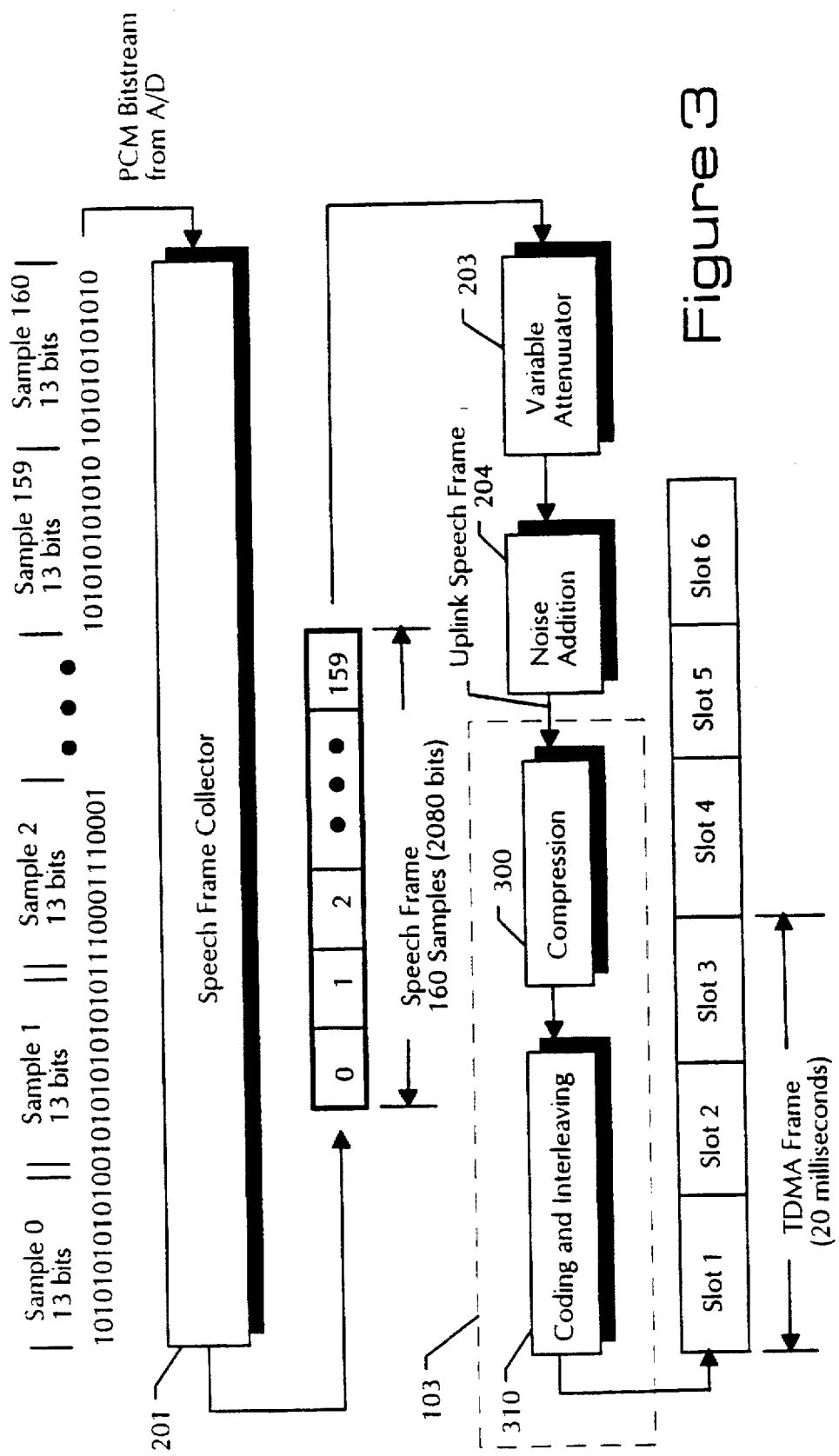
FIG. 3 is a pictorial illustration of how uplink speech frames are collected, processed, and orgainzed for transmission according to one embodiment the present invention.

The manner in which the speech frames are attenuated, comfort noise added, and the speech frames organized into TDMA frames for transmission is illustrated pictorially in FIG. 3. The 104 kilobit/second PCM bitstream produced by A/D converter 200 is coupled to speech frame collector 201 which outputs speech frames which are, in this example, 160 samples, or 2080 bits, in length. When the downlink path is open, the speech frames are attenuated by variable attenuator 203 whose output is coupled to noise adder 204. The uplink speech frames which are produced by noise adder 204 are coupled to radio transceiver 103.

Radio transceiver 103 receives the uplink speech frames and couples them to compression processor 300 which may be, for example, a VSELP speech coder as used in D-AMPS. VSELP compression reduces the bitrate from 104 kilobits/second to just under 8 kilobits/second. The compressed bits are coupled to coding and interleaving block 310 where the compressed bits are segregated into classes 1a, 1b, and 2. Cyclical redundancy check (CRC) bits for error correction are added to the class 1a and 1b bits, and then these bits undergo convolutional encoding. The encoded and error corrected bits then undergo interleaving. After the addition of overhead bits, the bitrate is 16.2 kilobits/second. The 16.2 kilobit/second bitstream is used to digitally modulate a radio carrier using π/4 shifted DQPSK. Each compressed, encoded, and interleaved speech frame is transmitted as a burst transmission in one slot of a TDMA frame to base station 108. A similar procedure is performed by base station 108 on the downlink. The compression, coding and interleaving are performed according to known techniques such as described in the aforementioned IS-54B specification now incorporated herein by reference in its entirety.

In full-rate IS-54-B, each 30 kHz duplex radio channel is divided into three time slots known as a TDMA frame. Each TDMA frame may be occupied by three different users thereby increasing the capacity of the limited radio frequency spectrum. Each user is assigned a separate slot. A TDMA frame is shown in FIG. 3. A first user may be assigned slots 1 and 4, for example, to transmit uplink signals to base station 108, slots 2 and 5 are used by the first user for receiving downlink signals from base station 108. Slots 3 and 6 are used by the first user for performing measurements of other channels for mobile assisted handover (MAHO). A second user may be assigned to transmit uplink signals on slots 2 and 5 and a third user may be assigned to transmit on slots 3 and 6, and so forth.

Referring again to FIG. 2, it is illustrated that the operation of variable attenuators 203 and 212, switches 205 and 208, as well as mute block 213 is controlled by decision logic 206. The operation of decision logic 206 is illustrated by the state machine shown in FIG. 4. Since the TDMA frame is 20 milliseconds in length, there is a 20 millisecond pause between between each state in the state diagram. The decision process starts at state S0AB with both uplink and downlink paths open.

Figure 4:
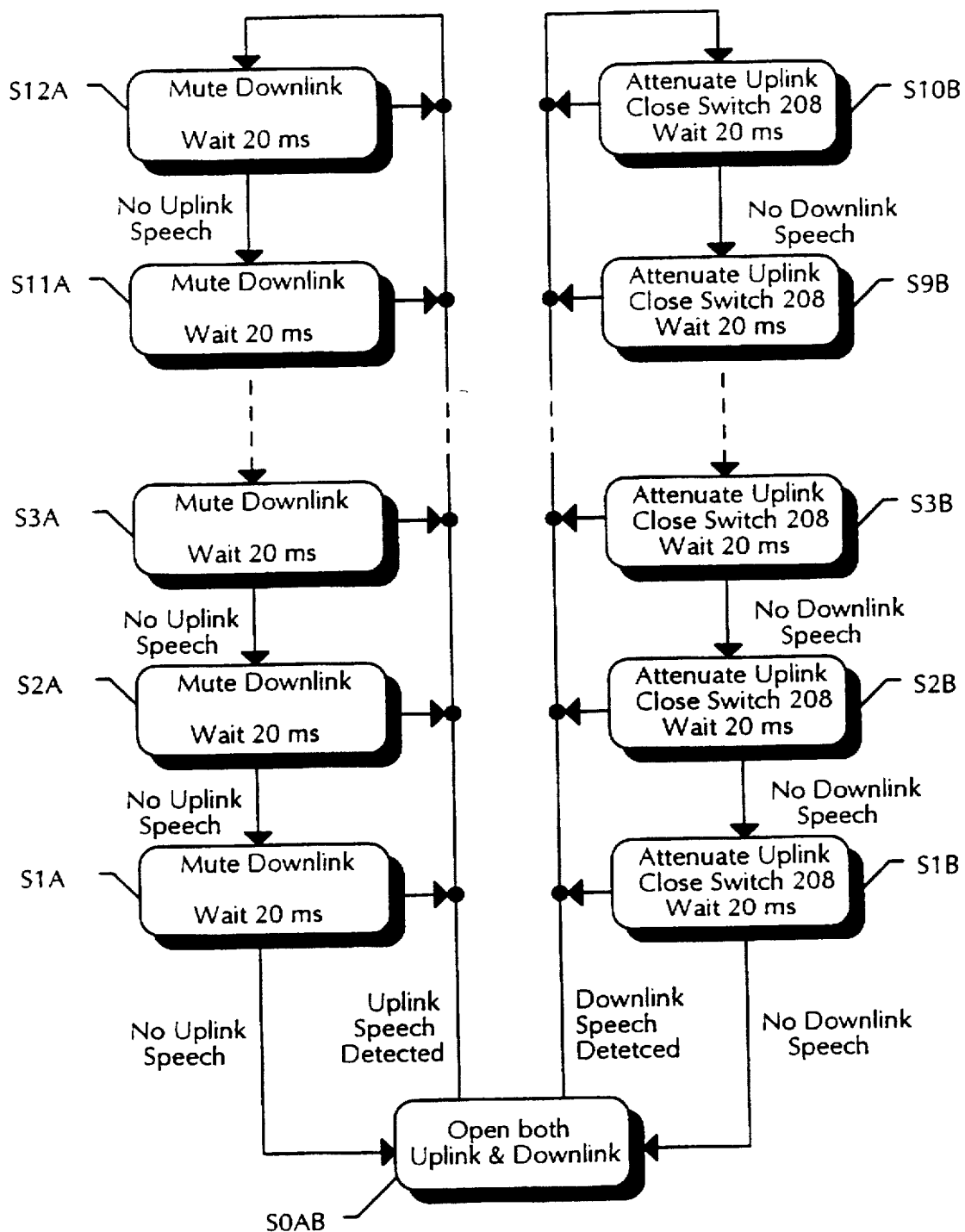
FIG. 4 is a state diagram illustrating the function of the decision block.

Returning to state S0AB of the state machine shown in FIG. 4, if uplink speech detector 202 transmits to decision logic 206 an indication that human speech is present in the speech frame, the state machine reverts to state S12A and the decision logic 206 engages block 213 which interrupts the downlink speech frame (i.e., a PCM bitstream) flow to D/A converter 210 which silences downlink loudspeaker 104 (i.e., mutes the downlink.) Alternatively, the downlink speech frames could be attenuated by means of a fixed or variable attenuator. For each speech frame in which human speech is detected, the state machine reverts back to state S12A. When uplink speech detector 202 indicates to decision logic 206 that human speech is not present in the speech frame, the state machine moves to the next lowest state (e.g., S11A). If no human speech is detected in the speech frames by uplink speech detector 202 after 12 consecutive speech frames (i.e., states S11A-S1A), the state machine restarts at state S0AB, mute block 213 is reset to restore the downlink speech frame flow to D/A converter 210, and the downlink path is thereby un-muted. By having 12 states, there is a 240 millisecond "hang-over" which allows any potential echo to completely propagate through the landline and cellular communication system before the downlink path is unmuted.

During periods when the downlink is muted, but no human speech is detected by uplink speech detector 202, decision logic 206 closes switch 205 to fill noise buffer 211 with a speech frame representing the background noise. This may be updated on a periodic basis; the desired result is to have stored in noise buffer 211, a speech frame representative of the background noise in which the hands-free system is operating. Whenever human speech is detected by uplink speech detector 202, switch 205 is opened.

From state S0AB (i.e., both uplink and downlink paths open) when human speech is detected by downlink speech detector 207, the state machine reverts to state S10B and the decision logic engages variable attenuator 203. The attenuation provided by variable attenuator 203 may be gradually increased for each consecutive indication from downlink speech detector 207 that human speech is present in the downlink speech frames. By applying attenuation incrementally in small steps, or all at once in a larger step, rather than completely muting the uplink speech frame, the user of the hands-free system may still be heard if he/she raises his/her voice to a level well above that of the background noise. Alternatively, the attenuation may be applied all at once in a larger increment of, for example, 14 dB. If the speech frames are attenuated gradually in variable attenuator 203, then the noise frame stored in noise buffer 211 is also incrementally attenuated in block 212 inversely proportional to the attenuation applied to the speech frame by block 204. Gradually "un-attenuating" the noise frames keeps the energy delivered to the landline user at a consistent level.

Ambient background noise from noise buffer 211, attenuated by attenuator 212 so that it is of the proper energy level, is added to the speech frames in noise adder 204, to produce uplink speech frames. The uplink speech frames are coupled to radio transceiver 103 where they are processed as previously discussed. By attenuating, rather, than completely deleting, or replacing, the speech frames, the landline user is able to hear if the hands-free user is trying to "cut-in" while still providing sufficient echo reduction. The output of the noise adder is referred to as the uplink speech frame.

Figure 5A:
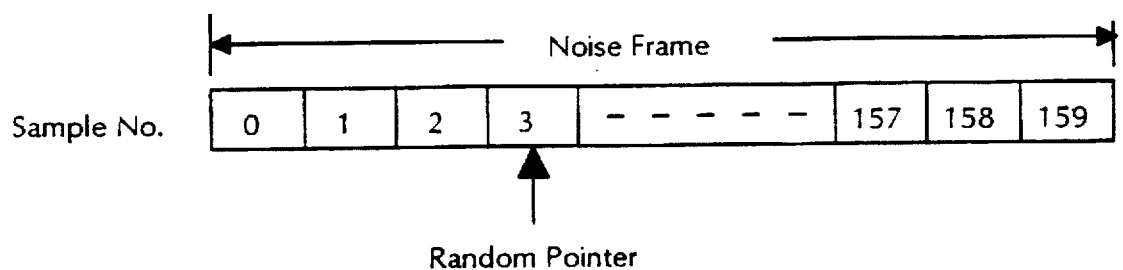
FIG. 5a is a schematic illustration of a noise frame.
Figure 5B:
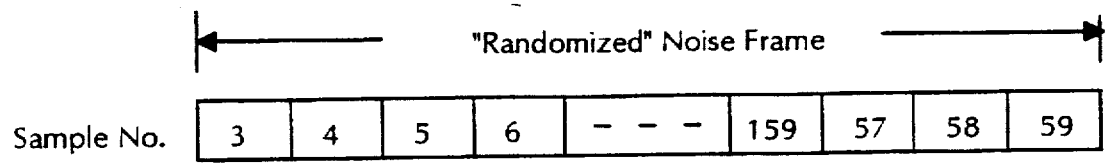
FIG. 5b is a schematic illustration of a randomly ordered noise frame.

A further aspect of the present invention relates to how the contents of the noise buffer 211 may be "randomized" to prevent any periodic modulation from being present in the uplink speech frames. When variable attenuator 203 is engaged, decision logic 206 closes switch 208 which transfers the contents of noise buffer 211 to the noise addition block 204. An example of a noise frame is shown in FIG. 5a. As previously mentioned, the noise frame is a speech frame representing ambient noise which was stored previously in the noise buffer 211. For each attenuated speech frame, the noise frame is randomly ordered using information generated in random generator 209 before it is added to the attenuated speech frame. If, for example, there are 160 samples (numbered 0–159) stored in noise buffer 211, the samples are transferred to the adder 204 in a quasi-random order. For example, as shown in FIG. 5b, if sample number 3 (three) is selected as the starting point, then the noise buffer is emptied starting with sample 3, through sample 159. To prevent having a constant cross-over point, the remaining portion of the buffer locations are filled starting with another random location in the noise buffer 211. By randomizing the order of the noise frame, successive applications of the contents of noise buffer 211 will avoid producing a periodic modulation in the uplink speech frames that would result if the same starting point was repeatedly used. It is obvious to one of ordinary skill in the art that other techniques could be used to randomly order the noise buffer. However, the intent of this feature of the present invention is not to apply the same noise frame repeatedly, but to repeatedly apply randomly selected pieces of the same noise frame.

It would also be advantageous to use this feature of the present invention when practicing the invention claimed by U.S. Pat. No. 5,222,251. Therein is described a hands-free system where signals on the reverse path (or downlink) are replaced by codewords that are at the same level as the ambient noise. According to this feature of the present invention, the codewords described in U.S. Pat. No. 5,222,251 could be randomly ordered with each successive application to prevent a periodic modulative effect.

Figure 6:
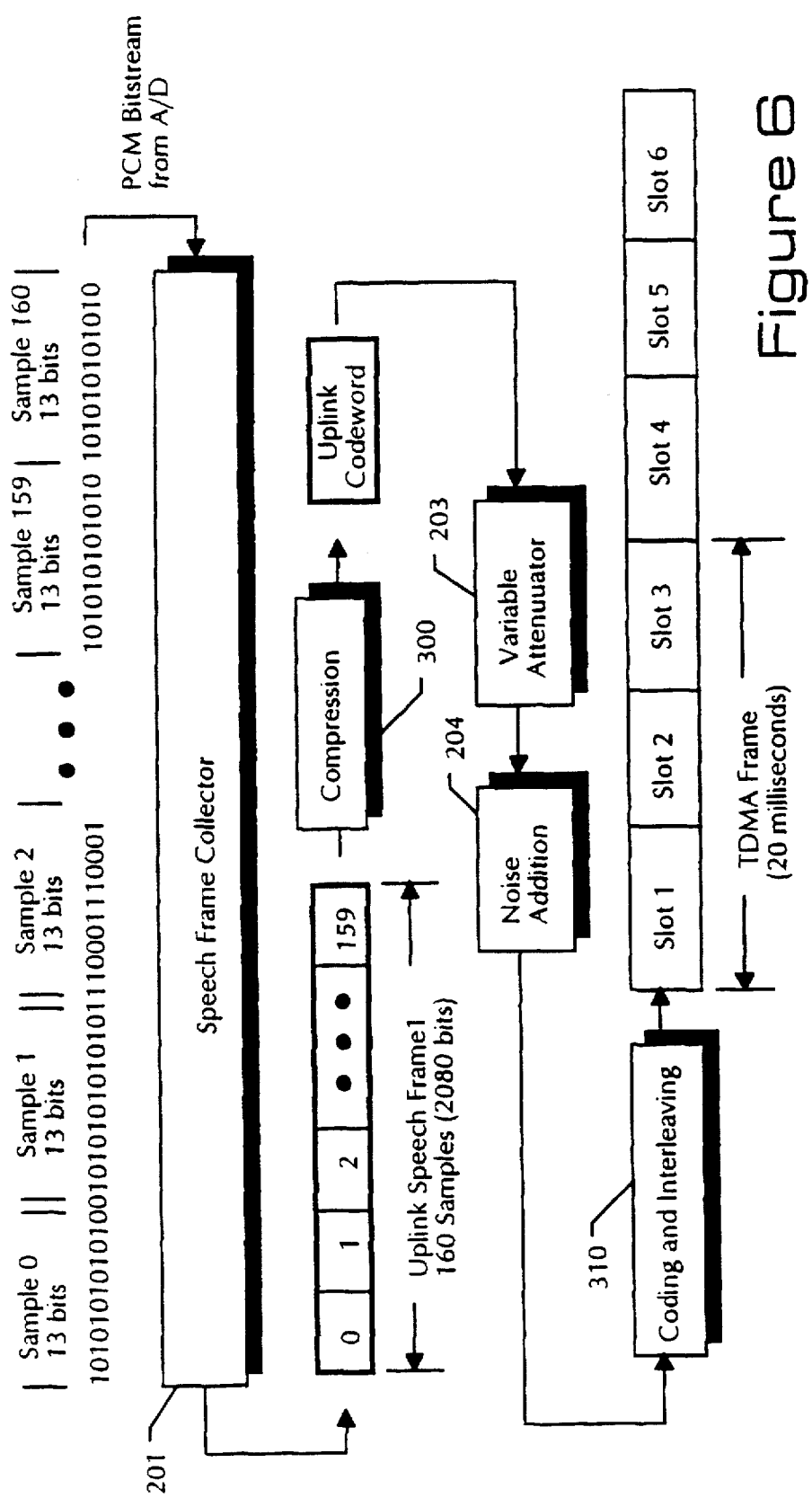
FIG. 6 is an pictorial illustration how uplink speech frames are collected, processed, and orgainzed for transmission according to an alternate embodiment the present invention.

An alternative embodiment of the present invention, is illustrated in FIG. 6 where the variable attenuator 203 and noise addition block 204 have been moved to the other side of the compression block 300. In this embodiment, attenuation is applied to the compressed speech frame, or speech codeword, and the contents of the noise buffer 211 must be compressed according to the particular algorithm being used to produce a codeword representing ambient noise, or noise codeword. The noise codeword is added, or otherwise used to modify, the attenuated speech codeword. By performing acoustic echo reduction on the other side of the compression block, the amount of memory needed to implement the invention may be reduced. Depending upon the specific compression technique employed, the tradeoff for reduced memory may be offset by additional complexity in manipulating the codewords.

While the present invention has been described with respect to a particular embodiment, those skilled in the art will recognize that the present invention is not limited to the specific embodiments described and illustrated herein. Different embodiments and adaptations besides those shown and described as well as many variations, modifications and equivalent arrangements will now be reasonably suggested by the foregoing specification and drawings without departing from the substance or scope of the invention. While the present invention has been described herein in detail in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. A method for reducing the echo in a hands-free radio communication device, the radio communications device generating uplink speech frames and receiving downlink speech frames, the method comprising the steps of:

determining when the downlink speech frames include speech signals; and attenuating the uplink speech frames and adding thereto a noise frame generated by the radio communications device wherein said noise frames and said speech frames are gradually attenuated and un-attenuated respectively so that when added together the sum of the speech frame and the noise frame is a relatively constant energy level.

2. A method for reducing the echo in a hands-free radio communication device, the radio communications device generating uplink speech frames and receiving downlink speech frames, the method comprising the steps of:

determining when the downlink speech frames include speech signals; and attenuating the uplink speech frames and adding thereto a noise frame generated by the radio communications device comprising a plurality of samples from a speech frame that represents ambient noise wherein the samples of said noise frame are selectively reordered before being added to each successive speech frame.

3. A method according to claim 2 wherein the attenuation to the uplink speech frames is incrementally applied.

4. An apparatus for reducing the echo in a hands-free cellular radio communication system having a hands-free system for transmitting uplink speech frames to a cellular transceiver and for receiving downlink speech frames from the cellular transceiver, said hands-free system comprising:

speech detection means for determining when human speech characteristics are present in the downlink speech frames;

attenuation means for selectively attenuating uplink speech frames; and noise addition means for adding a noise frame (generated by the hands-free system representing ambient noise) comprising a plurality of samples from a speech frame representing ambient noise to the attenuated uplink speech frames wherein the samples of said noise frame are selectively reordered before being added to each successive speech frame.

5. An apparatus for reducing the echo in a hands-free cellular radio communication system having a hands-free system for transmitting uplink speech frames to a cellular transceiver and for receiving downlink speech frames from the cellular transceiver, said hands-free system comprising:

speech detection means for determining when human speech characteristics are present in the downlink speech frames;

attenuation means for selectively attenuating uplink speech frames; and noise addition means for adding a noise frame generated by the hands-free system representing ambient noise to the attenuated uplink speech frames wherein said noise frames and said speech frames are gradually attenuated and un-attenuated respectively so that when added together the sum of the speech frame and the noise frame is a relatively constant energy level.

6. An apparatus for reducing the echo in a hands-free cellular radio communication system comprising a hands-free system coupled to a cellular transceiver, said hands-free system comprising:

a microphone for producing an analog signal which is coupled to an analog to digital converter, the analog to digital converter producing a digital bitstream representative of the analog signal;

a speech frame collector for arranging the digital bitstream into speech frames;

an uplink speech detector coupled to said speech frame collector for analyzing the speech frames for human speech characteristics;

a downlink speech detector for analyzing the downlink speech frames received from the cellular transceiver for human speech characteristics;

decision logic coupled to said uplink speech detector and said downlink speech detector, a variable attenuator coupled to said decision logic block and responsive to signals generated by the decision logic for selectively attenuating the speech frames received from said speech frame collector;

a noise adder coupled to said variable attenuator for adding a noise frame (generated by the hands-free system and representing ambient noise) comprising a plurality of samples from a speech frame which represent ambient noise to the attenuated speech frames received from said variable attenuator wherein the samples of said noise frame are selectively reordered before being added to each successive speech frame;

noise frame attenuator coupled to said noise adder and said decision logic, responsive to signals produced by said decision logic, for selectively attenuating said noise frame;

a noise buffer coupled to said noise frame attenuator for storing said noise frame;

a mute block coupled to said decision logic for selectively muting the downlink speech frames in response to signals received from the decision logic;

a digital to analog converter coupled to said mute block for receiving unmuted downlink speech frames; and a loudspeaker coupled to said digital to analog converter for producing audible sound.

7. An apparatus for reducing the echo in a hands-free cellular radio communication system comprising a hands-free system coupled to a cellular transceiver, said hands-free system comprising:

a microphone for producing an analog signal which is coupled to an analog to digital converter, the analog to digital converter producing a digital bitstream representative of the analog signal;

a speech frame collector for arranging the digital bitstream into speech frames;

an uplink speech detector coupled to said speech frame collector for analyzing the speech frames for human speech characteristics;

a downlink speech detector for analyzing the downlink speech frames received from the cellular transceiver for human speech characteristics;

decision logic coupled to said uplink speech detector and said downlink speech detector;

a variable attenuator coupled to said decision logic block and responsive to signals generated by the decision logic for selectively attenuating the speech frames received from said speech frame collector;

a noise adder coupled to said variable attenuator for adding a noise frame generated by the hands-free system and representating ambient noise to the attenuated speech frames received from said variable attenuator;

noise frame attenuator coupled to said noise adder and said decision logic, responsive to signals produced by said decision logic, for selectively attenuating said noise frame wherein said noise frames and said speech frames are gradually attenuated and un-attenuated respectively so that when added together the sum of the speech frame and the noise frame is a relatively constant energy level;

a noise buffer coupled to said noise frame attenuator for storing said noise frame;

a mute block coupled to said decision logic for selectively muting the downlink speech frames in response to signals received from the decision logic;

a digital to analog converter coupled to said mute block for receiving unmuted downlink speech frames; and a loudspeaker coupled to said digital to analog converter for producing audible sound.

8. An apparatus for reducing the echo in a hands-free radio communication device, the radio communications device generating uplink speech frames which are transmitted to a base station over an uplink digital radio communications channel and the base station transmitting downlink speech frames to the communications device over a downlink digital communications channel, the apparatus comprising:

a microphone;

an analog to digital converter coupled to the microphone for producing digital samples;

a speech frame collector for arranging the digital samples into uplink speech frames;

an uplink speech detector for determining if speech is present in the uplink speech frames;

a downlink speech detector for determining if speech is present in the downlink speech frames;

decision logic coupled to the uplink speech detector and the downlink speech detector for determining which communications path is active;

an attenuator coupled to the decision logic for attenuating the uplink speech frames;

a noise buffer for storing a speech frame comprising a plurality of samples from a speech frame representing ambient noise; and an adder for adding the contents of the noise buffer to said attenuated uplink speech frames wherein the samples of said noise frame are selectively reordered before being added to each successive speech frame.

9. The apparatus of claim 8 wherein said attenuator is a variable attenuator.

* * * * *